US012711688B2

(12) United States Patent
Kiyomiya

(10) Patent No.: US 12,711,688 B2
(45) Date of Patent: Aug. 18, 2026

(54) INFORMATION PROCESSING DEVICE AND STORAGE MEDIUM STORING COMPUTER PROGRAM

(71) Applicant: BANDAI CO., LTD., Tokyo (JP)

(72) Inventor: Ryota Kiyomiya, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 103 days.

(21) Appl. No.: 18/811,825

(22) Filed: Aug. 22, 2024

(65) Prior Publication Data

US 2025/0069310 A1 Feb. 27, 2025

(30) Foreign Application Priority Data

Aug. 25, 2023 (JP) ................................ 2023-137374

(51) Int. Cl.
*G06T 13/40* (2011.01)
*A63F 13/55* (2014.01)
(Continued)

(52) U.S. Cl.
CPC .............. *G06T 13/40* (2013.01); *A63F 13/55* (2014.09); *A63F 13/63* (2014.09); *A63F 13/65* (2014.09);
(Continued)

(58) Field of Classification Search
CPC .......... A63F 13/55; A63F 13/63; A63F 13/65; G06T 7/70; G06T 13/40; G06T 17/00;
(Continued)

(56) References Cited

U.S. PATENT DOCUMENTS 8,848,201 B1 * 9/2014 Bruce .................. G01B 21/047 356/601
2014/0210856 A1 * 7/2014 Finn ..................... H04N 13/275 345/633
(Continued)

FOREIGN PATENT DOCUMENTS

JP 2017-064120 A 4/2017
JP 2020-107251 A 7/2020
(Continued)

OTHER PUBLICATIONS

Baran, et. al, "Automatic Rigging and Animation of 3D Characters", ACM TCM Transactions on Graphics, vol. 26, No. 3, Jul. 29, 2007, 72ff (Year: 2007).*
(Continued)

*Primary Examiner* — Cory A Almeida
(74) *Attorney, Agent, or Firm* — Paratus Law Group, PLLC

(57) ABSTRACT

An information processing device including: a scan controller that causes a scanner to scan an outer appearance of an object disposed on a table and generate a scan image; a data generator that generates 3-dimensional model data from the scan image; a video generator that generates a video in which a 3-dimensional model based on the 3-dimensional model data is disposed in a virtual space; and a receiver that receives a designation input of joint positions for the 3-dimensional model data, in which the data generator generates the 3-dimensional model data in association with joint information on the joint positions designated by the designation input, and the video generator generates the video of the 3-dimensional model in which a joint of the 3-dimensional model data is operated based on the joint information.

15 Claims, 13 Drawing Sheets

(51) Int. Cl.

| | |
|---|---|
| ***A63F 13/63*** | (2014.01) |
| ***A63F 13/65*** | (2014.01) |
| ***G06T 7/70*** | (2017.01) |
| ***G06T 17/00*** | (2006.01) |
| ***G06T 19/00*** | (2011.01) |
| ***G06T 19/20*** | (2011.01) |
| ***H04N 13/15*** | (2018.01) |
| ***H04N 13/261*** | (2018.01) |
| ***H04N 13/271*** | (2018.01) |
| ***H04N 13/275*** | (2018.01) |
| ***H04N 13/293*** | (2018.01) |
| ***H04N 13/296*** | (2018.01) |

(52) U.S. Cl.
CPC ................ *G06T 7/70* (2017.01); *G06T 17/00* (2013.01); *G06T 19/00* (2013.01); *G06T 19/006* (2013.01); *G06T 19/20* (2013.01); *H04N 13/15* (2018.05); *H04N 13/271* (2018.05); *H04N 13/275* (2018.05); *H04N 13/293* (2018.05); *H04N 13/296* (2018.05); *G06T 2200/24* (2013.01); *G06T 2207/10008* (2013.01); *G06T 2207/10028* (2013.01); *G06T 2207/30204* (2013.01); *G06T 2219/2004* (2013.01); *G06T 2219/2016* (2013.01); *H04N 13/266* (2018.05)

(58) Field of Classification Search
CPC ....... G06T 19/00; G06T 19/006; G06T 19/20; G06T 2200/24; G06T 2207/10008; G06T 2207/10028; G06T 2207/30204; G06T 2219/2004; G06T 2219/2016; H04N 13/15; H04N 13/266; H04N 13/271; H04N 13/275; H04N 13/293; H04N 13/296
See application file for complete search history.

(56) References Cited

U.S. PATENT DOCUMENTS

| | | | |
|---|---|---|---|
| 2016/0284135 A1* | 9/2016 | Kamhi | G06T 19/20 |
| 2022/0198835 A1 | 6/2022 | Yamagishi et al. | |
| 2024/0005600 A1 | 1/2024 | Tahara | |

FOREIGN PATENT DOCUMENTS

| | | |
|---|---|---|
| JP | 2022-187952 A | 12/2022 |
| WO | WO 2021/131738 A1 | 7/2021 |

OTHER PUBLICATIONS

Jul. 29, 2024, Japanese Office Action issued for related JP Application No. 2023-137374.

* cited by examiner 300
411
413
412
413
413
412
411
406
413

415
413
402
300
411
406
414
412

INFORMATION PROCESSING DEVICE AND STORAGE MEDIUM STORING COMPUTER PROGRAM

CROSS-REFERENCE TO RELATED APPLICATION

This application is based upon and claims the benefit of priority from Japanese Patent Application No. 2023-137374, filed on Aug. 25, 2023, the entire contents of which are incorporated herein by reference.

TECHNICAL FIELD

The present invention relates to an information processing device and a storage medium storing a computer program.

BACKGROUND ART

JP2020-107251A discloses a technique for generating a virtual space image viewed from a virtual camera in a virtual space by primitively mapping, in the virtual space, textures that are generated from a captured image group obtained by causing imaging units to image a target in a plurality of imaging directions.

In the generation of the virtual space image as in the above technique, it is expected that an unnatural motion of 3-dimensional model data is prevented when a target is imaged to generate a video in which a 3-dimensional model is disposed in the virtual space using the 3-dimensional model data of the imaged target.

Accordingly, an object of the present invention is to prevent an unnatural motion of a 3-dimensional model data when a target is imaged to generate a video in which a 3-dimensional model is disposed in a virtual space using the 3-dimensional model data of the imaged target.

SUMMARY OF INVENTION

According to an aspect of the present invention, there is provided an information processing device including:

- a scan controller configured to cause a scanner to scan an outer appearance of an object disposed on a table and generate a scan image;
- a data generator configured to generate 3-dimensional model data from the scan image;
- a video generator configured to generate a video in which a 3-dimensional model based on the 3-dimensional model data is disposed in a virtual space; and
- a receiver configured to receive a designation input of joint positions for the 3-dimensional model data,
- in which the data generator is configured to generate the 3-dimensional model data in association with joint information on the joint positions designated by the designation input, and
- the video generator is configured to generate the video of the 3-dimensional model in which a joint of the 3-dimensional model data is operated based on the joint information.

DESCRIPTION OF EMBODIMENTS

Figure 1:
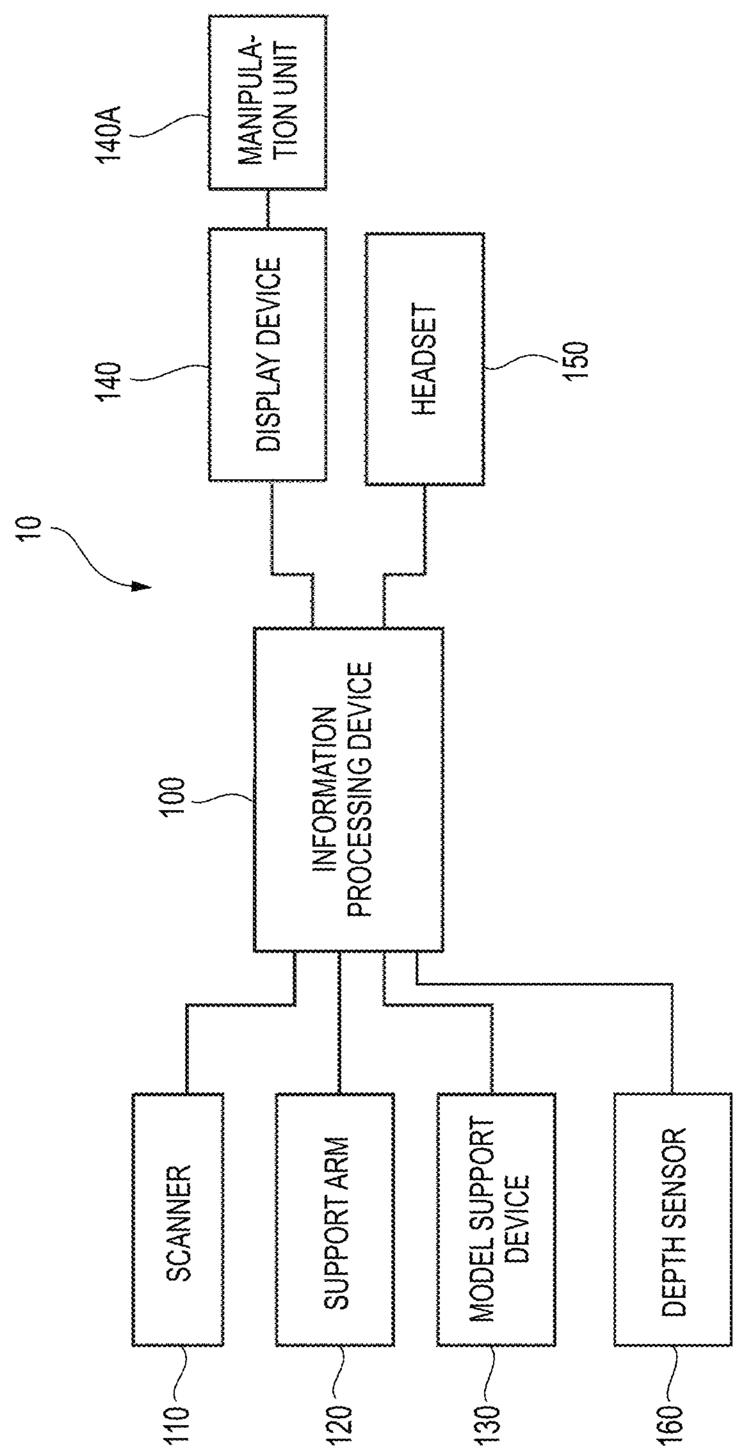
FIG. 1 is a diagram illustrating an example of a configuration of an image processing system according to an embodiment.

Hereinafter, an embodiment will be described in detail with reference to the appended drawings. The following embodiment does not limit the present invention according to the claims and all combinations of features described in the embodiment are not requisite for the present invention. Of a plurality of features described in the embodiment, two or more features may be arbitrarily combined. The same reference numerals denote the same or similar configurations and repeated description thereof will be omitted. In each drawing, upper, lower, left, right, front, and back directions relative to the sheet are used as upper, lower, left, right, front, and back directions of components (parts) in the embodiment in description of the text.

First, a configuration of an image processing system according to an embodiment will be described. FIG. 1 is a diagram illustrating an example of a configuration of an image processing system 10 according to the embodiment. In the image processing system 10, a scanner 110, a support arm 120, a model support device 130, a display device 140, a headset 150, a depth sensor 160, and the like are connected to an information processing device 100. The configuration of the system is not limited to the configuration illustrated in FIG. 1, and the information processing device 100 may be further connected to an external server, a cloud server, or the like via a network. In the external server or the like, at least some of processes according to the embodiment to be described below can be performed.

The information processing device 100 controls an operation of at least any one of the scanner 110, the support arm 120, the model support device 130, and the depth sensor 160 and images an imaging target item at any angle to generate a plurality of images and generate 3-dimensional model data (present data) from the plurality of images. When the imaging target item can be separated into a plurality of constituent items, 3-dimensional model data of the target item may be generated by imaging each constituent item to generate 3-dimensional model data and integrating the 3-dimensional model data. The information processing device 100 is not limited to a single device. Functions may be distributed to a plurality of devices and the distributed functions may be integrated to attain functions according to the embodiment.

The information processing device 100 can also function as a video generation device that generates a video that is displayed in a virtual space by using the generated 3-dimensional model data as virtual space data. In the embodiment, an imaging target object is any of items such as an assembly plastic model, an action figure (a figure that has movable joints), a toy, and a doll, which are collectively referred to as "models" below.

Next, the scanner 110 is a 3-dimensional scanner device that images (scans) a 3-dimensional shape of an imaging target model under the control of the information processing device 100 and outputs the 3-dimensional shape and color information of the imaging target. In the embodiment, scan signals output from the scanner 110 are collectively referred to as a "scan image". As the scanner 110, for example, Space Spider manufactured by Artec Co., Ltd. can be used. In the embodiment, for example, by acquiring about 500 frames to 800 frames of the scan images, it is possible to acquire 3D scan data of an entire toy. As the scanner 110, for example, a smartphone with a camera in which an application for capturing a 3-dimensional shape is installed may be used.

The support arm 120 is a position and pose control device that moves the scanner 110 to a predetermined imaging position and pose under the control of the information processing device 100. The support arm 120 may be configured to change an imaging position and pose manually and to maintain the changed position and pose fixedly or may be configured to be able to be controlled by the information processing device 100. When the support arm 120 can be controlled by the information processing device 100, for example, xArm7 manufactured by UFACTORY Co. Ltd., can be used. xARM7 includes seven joints and can move similarly to a human arm. Instead of the support arm 120, the scanner 110 can be positioned manually. For an imaging position and pose that cannot be covered by the support arm 120, the scanner 110 may be manually operated to perform scanning.

The model support device 130 is a support stand that supports a model fixed at a pose (or an installation table on which a model is installed). The model support device 130 may be configured to be able to rotate when the model is installed on the support stand or at the distal end of a support rod. In the embodiment, after the scanner 110 is positioned at any imaging position and imaging angle by the support arm 120, the model support device 130 is rotated to perform imaging. The model support device 130 can rotate in both clockwise and counterclockwise directions. The model support device 130 can be stopped at any rotational angle within a range of 0 to 360 degrees, and imaging can also be performed by stopping the model support device 130 at a specific rotational angle and positioning the model support device 130 at any imaging position and imaging angle within a movable range of the scanner 110. By performing the operation described above at a plurality of rotational angles, imaging positions, and imaging angles, it is possible to obtain an image of an entire model. Here, by synchronously driving the model support device 130 and the support arm 120, it is possible to perform an imaging process more simply and with high accuracy. Instead of the model support device 130, the scanner 110 may be moved manually around the model to perform scanning at any imaging position and imaging angle.

The display device 140 is a display device such as a liquid crystal display (LCD) and can display a processing result in the information processing device 100. Specifically, images acquired with the scanner 110 can be displayed, the present data of the 3-dimensional model data generated from the captured images can be displayed, or an indicator for joint position setting to be described below can be superimposed and displayed on the present data of the 3-dimensional model data, or a video restored using the present data (VR video) can be displayed. The display device 140 can include a manipulation unit 140A that receives a manipulation from a user who is an observer of a display video, and thus the user can manipulate the manipulation unit 140A to perform a manipulation input in accordance with content of a video displayed on the display device 140.

The headset 150 includes a head-mounted display 150A and a controller 150B to be described below. In particular, the VR headset may be configured to provide a moving image corresponding to a pose or an inclination of the user who is an observer. A predetermined application can be installed in the headset 150, and application data that is executed in the application can be downloaded from the information processing device 100 to be executed. In the embodiment, like the information processing device 100, the headset 150 can also function as a video generation device that generates a video displayed on a virtual space using the 3-dimensional model data as virtual space data and provides the generated video as a VR video. The application data includes display data for displaying the VR video.

The depth sensor 160 is a sensor that can measure a distance to a subject or an object located in a predetermined space. The depth information acquired by the depth sensor 160 is output to the information processing device 100 and is used to specify positional information of an imaging target model by the scanner 110 and control a scan range of the scanner 110 and a movable range of the support arm 120. The depth sensor 160 can be installed on, for example, a stand of the support arm 120. Here, the installation position is not limited thereto and the depth sensor 160 can be installed at any location as long as a scan target installed on the model support device 130 can be measured without omission and there is no interference with a motion of the support arm 120. As the depth sensor 160, for example, a depth camera of a RealSense series manufactured by Intel Co. Ltd. can be used.

Figure 2A:
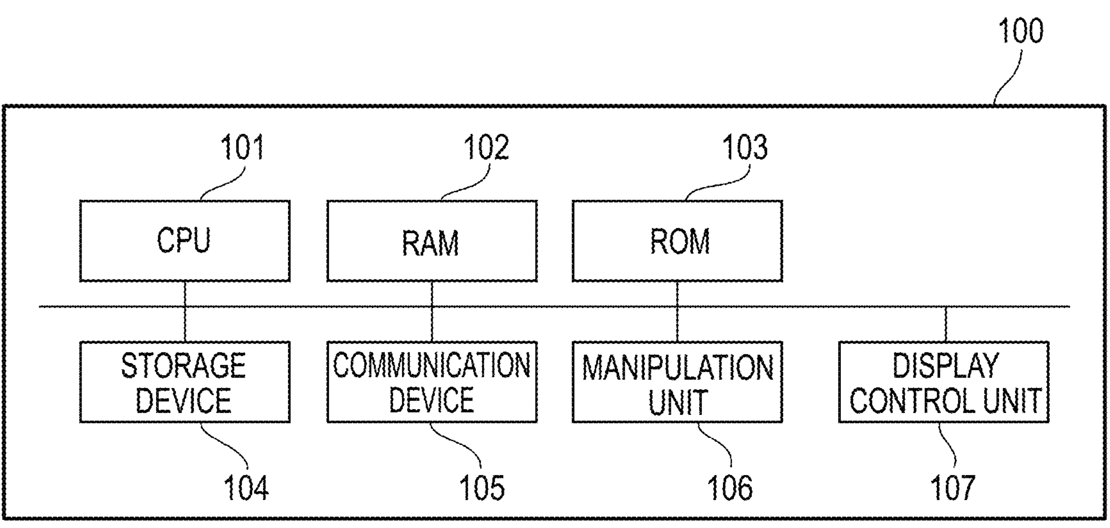
FIGS. 2A and 2B are diagrams illustrating examples of a hardware configuration of an information processing device and an example of a hardware configuration of a headset according to the embodiment.

Next, a hardware configuration of the information processing device 100 according to the embodiment will be described. FIG. 2A is a diagram illustrating an example of a hardware configuration of the information processing device 100. A CPU 101 is a device that controls the entire information processing device 100 and computes, processes, and manages data. For example, timings at which images are captured and the number of captured images in the scanner 110 can be controlled and arm joints of the support arm 120 can be controlled to dispose the scanner 110 at any imaging position and imaging angle. For example, after the imaging position and the imaging angle of the scanner 110 are determined, the model support device 130 can be rotated and an imaging operation can be performed by the scanner 110. After the model support device 130 is stopped at a predetermined rotational angle, an imaging operation can be performed at any imaging position and imaging angle by the scanner 110. By controlling operations of the scanner 110 and the support arm 120 based on depth information from the depth sensor 160, it is possible to narrow the imaging position and the imaging angle of the scanner 110 to a specific range.

The CPU 101 can also function as an image processing unit that processes an image output from the scanner 110. Specifically, the CPU 101 can perform a process of generating a video in which a 3-dimensional model is displayed in a virtual space using the 3-dimensional model data generated based on a scan signal obtained by the scanner 110 as virtual space data.

A RAM 102 is a volatile memory and is used as a main memory of the CPU 101 or a temporary storage area such as a work area. A ROM 130 is a nonvolatile memory and stores image data or other data, various programs causing the CPU 101 to operate, and the like in predetermined areas. The CPU 101 controls each unit of the information processing device 100 using the RAM 120 as a work memory in accordance with the program stored in, for example, the ROM 103. The program causing the CPU 101 to operate may be stored not in the ROM 103 but in the storage device 104.

The storage device 104 is configured with, for example, a magnetic disk such as a flash memory or an HDD. The storage device 104 stores an application program, an OS, a control program, an associated program, a game program, and the like. The storage device 104 can read and write data under the control of the CPU 101. The storage device 104 may be used instead of the RAM 102 or the ROM 103.

A communication device 105 is a communication interface that communicates with the scanner 110, the support arm 120, the model support device 130, the display device 140, the headset 150, and the depth sensor 160 under the control of the CPU 101. The communication device 105 may be further configured to be able to communicate with an external server or the like. The communication device 105 can include a wireless communication module. The module can include a known circuit mechanism that includes an antenna system, an RF transceiver, one or more amplifiers, a tuner, one or more oscillators, a digital signal processor, a CODEC chip set, a subscriber identification module card, and a memory. Here, communication performed by the information processing device 100 with the scanner 110, the support arm 120, the model support device 130, the display device 140, the headset 150, and the depth sensor 160 may be wireless communication.

The communication device 105 can also include a wired communication module for wired connection. The wired communication module enables communication with another device including the display device 140 via one or more external ports. The wired communication module can include various software components that process data. The external ports are coupled with other devices directly or indirectly via a network via an Ethernet, a USB, an IEEE1394, and the like. The wired communication module can also be configured as an alternative of a hardware device by software that implements the same function as each of the above devices.

A manipulation unit 106 is configured with, for example, a button, a keyboard, a touch panel, a controller, or the like and receives a manipulation input from a user. The manipulation unit 106 may be common to the manipulation unit 140A or may be independent of the manipulation unit 140A. For example, when the manipulation unit 140A is assumed to be a manipulation unit configured as a keyboard and a mouse, and the like, the manipulation unit 140A can be common to the manipulation unit 106. On the other hand, when the manipulation unit 140A is assumed to be a manipulation unit configured as a touch panel, a controller, or the like, the manipulation unit 140A can be a manipulation unit independent of the manipulation unit 106.

A display control unit 107 functions as a control unit that displays information on the display device 140 connected to the information processing device 100 and controls an operation of the display device 140. Some functions of the manipulation unit 106 may be included in the display device 140. For example, the display device 140 may be configured as a device that includes a touch panel like a tablet terminal.

Figure 2B:
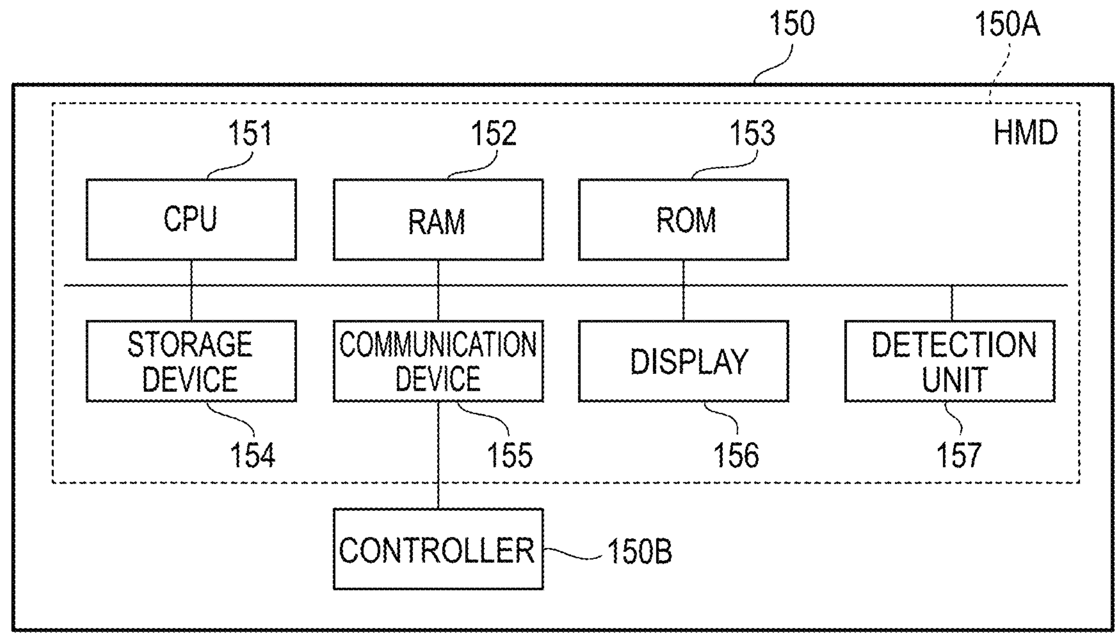

Next, a hardware configuration of the headset 150 according to the embodiment will be described. FIG. 2B illustrates an example of a hardware configuration of the headset 150. The headset 150 includes a head-mounted display (HMD) 150A and a controller 150B. The HMD 150A enables a user to feel a virtual reality (VR) experience by providing right-eye and left-eye videos to the right and left eyes of the user, respectively, and allowing a stereoscopic effect by a parallax. The controller 150B is provided in a casing independent of the HMD 150A. The controller 150B is configured as a pair of two controllers held and manipulated by right and left hands of the user, but may be configured as a single controller.

A CPU 151 is a device that controls the entire headset 150 and computes, processes, and manages data. For example, application data downloaded from the information processing device 100 can be executed and a VR video can be displayed on a display 156. Based on a manipulation received via a controller 156 or information detected by a detection unit 158, the displayed VR video can be switched, a viewpoint in a VR space can be switched, or a position in the VR space can be changed.

A RAM 152 is a volatile memory and is used as a main memory of the CPU 151 or a temporary storage area such as a work area. A ROM 153 is a nonvolatile memory and stores image data or other data, various programs causing the CPU 151 to operate, and the like in predetermined areas. The CPU 151 controls each unit of the headset 150 using the RAM 152 as a work memory in accordance with the program stored in, for example, the ROM 153. The program causing the CPU 151 to operate may be stored not in the ROM 153 but in the storage device 154.

The storage device 154 is configured with, for example, a magnetic disk such as a flash memory or an HDD. The storage device 154 stores an application program, an OS, a control program, an associated program, a game program, application data or display data downloaded from the information processing device 100, and the like. The storage device 154 can read and write data under the control of the CPU 151. The storage device 154 may be used instead of the RAM 152 or the ROM 153.

A communication device 155 is a communication interface that communicates with the information processing device 100 or the controller 150B under the control of the CPU 151. The communication device 155 includes a wireless communication module that enables wireless communication that is based on Bluetooth or WiFi (IEEE802.11). The headset 150 is connected to the information processing device 100 through wireless communication so that the display data of the VR video can be downloaded. Communication with the controller 150B is performed to receive information regarding a manipulation instruction of the user on the controller 150B.

A display 156 is configured such that right-eye and left-eye videos generated by the CPU 151 are provided to the right and left eyes of the user, respectively. A detection unit 157 is a mechanism that detects visual line directions of the right and left eyes of the user and detect an inclination of the head-mounted display. The detection unit 157 includes, for example, a sensor that detects a visual line direction or a gaze direction of the user wearing the HMD 150A. The detection unit 157 includes a gyroscope, magnetometer, an accelerometer, a global positioning system (GPS), and a compass and can specify a position, a pose, an inclination, and the like of the HMD 150A in accordance with such detection information. The detection unit 157 detects information for determining a gaze direction or an action of the user in the HMD 150A and transmits the information to the CPU 151. The CPU 151 determines the gaze direction or the action based don the received detection information and adjusts a video presented on the display 156 of the HMD 150A so that the video matches the determined gaze direction or action.

The controller 150B includes, for example, a plurality of buttons and a cross key and receives a manipulation input such as a selection manipulation or a direction instructing manipulation from the user. The controller 150B is connected to the HMD 150A via the communication device 155 through wireless communication.

Figure 3:
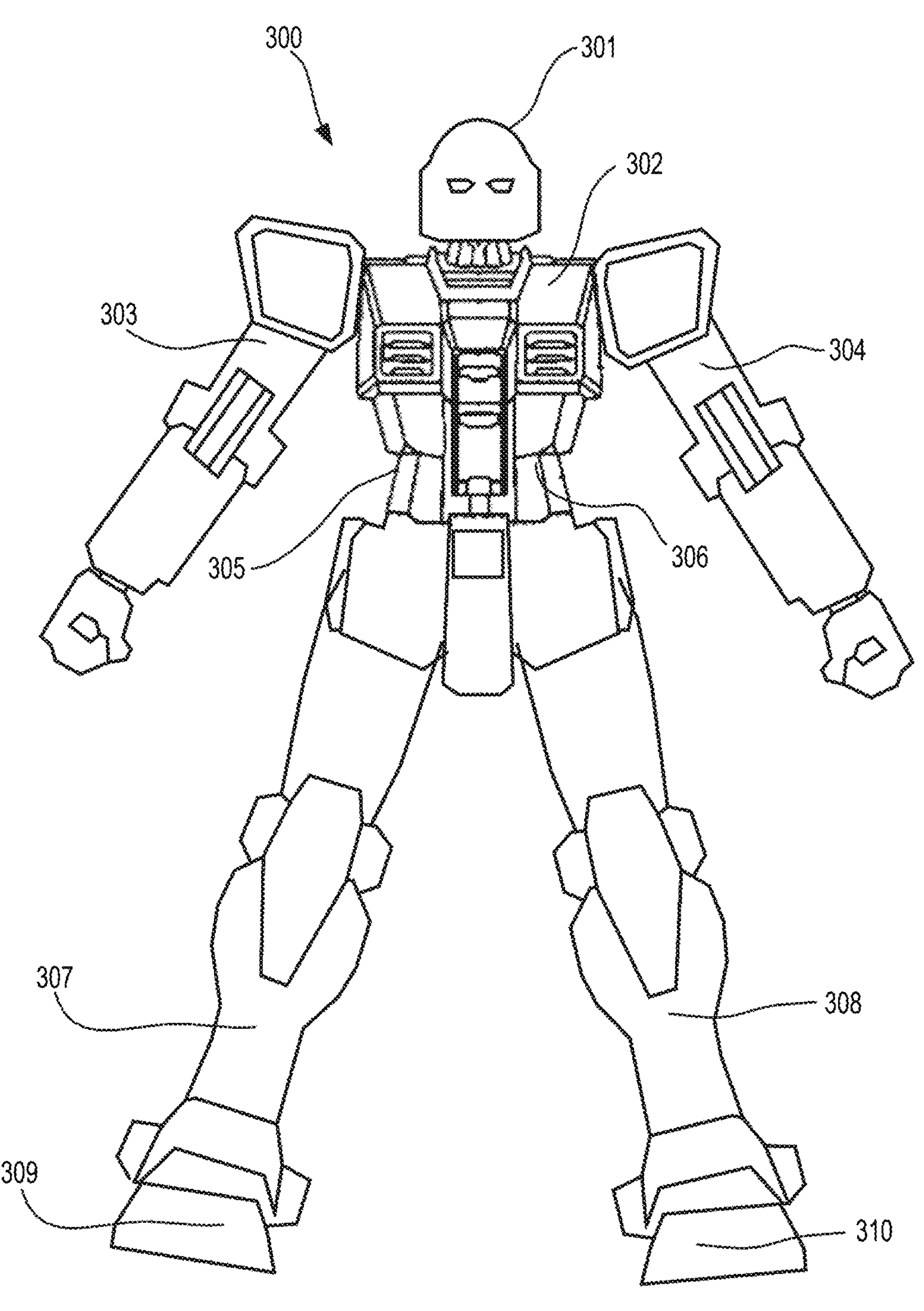
FIG. 3 is a diagram illustrating an example of an outer appearance of a humanoid model according to the embodiment.

Next, an example of a model that is an imaging target object according to the embodiment will be described with reference to FIG. 3. A model 300 is a model that has a humanoid outer appearance (a robot or a person). The model can be assembled and painted as, for example, a plastic model. Alternatively, the model may be a completed model such as a figure that has movable joints (action figure). The model of FIG. 3 is merely exemplary for description, and the shape of the model is not limited to the humanoid outer appearance and may be any shape of a model such as a general vehicle, a race vehicle, a military vehicle, an aircraft, a ship, an animal, a virtual creature. An imaging target item is, of course, not limited to a model as long as a 3-dimensional shape of the item can be imaged by the scanner 110.

The model 300 includes components such as a head part 301, a chest part 302, a right arm part 303, a left arm part 304, a right torso part 305, a left torso part 306, a right leg part 307, a left leg part 308, a right foot part 309, a left foot part 310, which are assembled together. At least some of the parts 301 to 310 are supported to be rotatable (or swingable) relative to adjacent parts. For example, the head part 301 is supported to be rotatable relative to the chest part 302, and the right arm part 303 and the left arm part 304 are supported to be rotatable relative to the chest part 302. Since the parts of the model 300 have such a joint structure, the model 300 can take any pose.

Figure 4A:
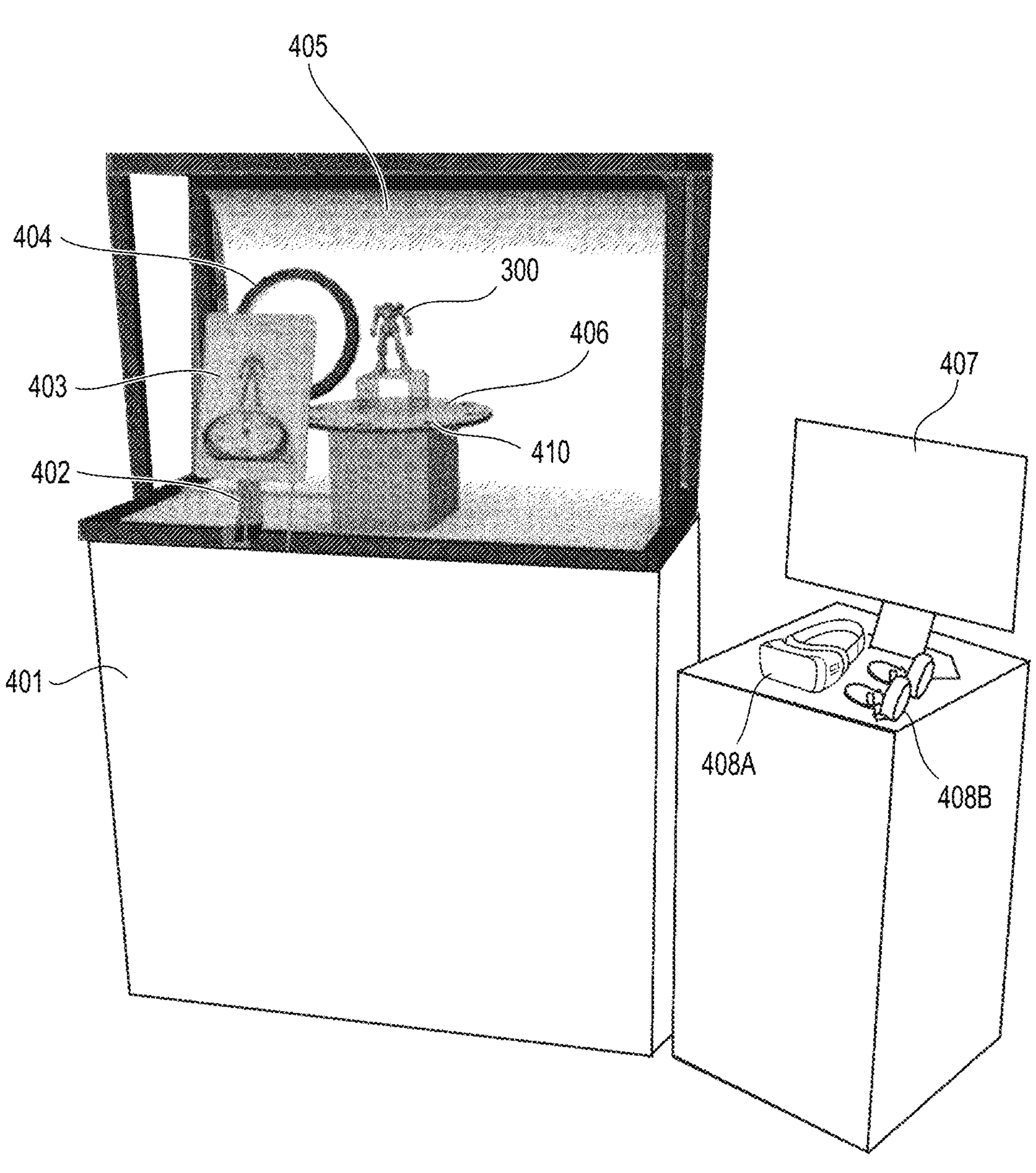
FIG. 4A is a diagram illustrating an example of implementation of the image processing system.

Next, an overall implementation example of the image processing system 10 according to the embodiment will be described with reference to FIG. 4A. FIG. 4A is a diagram illustrating a general implementation example in which the present data generated by imaging the model can be generated.

In FIG. 4A, a driving system that drives the information processing device 100 and the support arm 402 and a driving system that drives a turntable 406 are included in a case 401. An imaging direction and position of the support arm 402 can be adjusted manually. The surface of the case 401 has a flat structure to which an advertising poster can be attached.

The support arm 402 corresponds to the support arm 120 and can support a terminal 403 functioning as the scanner 110 manually or under the control of the information processing device 100 to fix the position of the terminal 403. The support arm 402 can also operate to control an inclination of the terminal 403.

The terminal 403 is a touch panel type terminal that can be used as the scanner 110 and contains a camera. For example, a smartphone, a tablet terminal, a digital camera, or the like can be used. Instead of such a terminal, Space Spider manufactured by Artec Co., Ltd. can also be used. FIG. 4A is just a diagram illustrating a generalized example of a system configuration. The configuration can be realized in accordance with a type of device used as the scanner 110. The terminal 403 can capture an image of the model 300 and can transmit the image to the information processing device 100. A ring light 404 is an illumination device used when the model 300 is imaged by the terminal 403, and evenly light the model 300 so that the shadow is minimized. As an additional light source, a top light or supplementary lights on the right, left, and lower sides may be installed in addition to the ring light 404. Instead of the terminal 403, the above-described 3-dimensional scanner device may also be used.

A background sheet 405 is an imaging background sheet. For example, a white sheet can be used. The model 300 is mounted on the turntable 406 that can be rotated with the model thereon. A configuration that includes the turntable 406 and the driving system corresponds to the model support device 130 and clockwise and counterclockwise rotating and stopping operations of the turntable 406 is performed under the control of the information processing device 100. A plurality of predetermined markers 410 may be disposed on the turntable 406. The markers 410 can be used to adjust a direction or a position of an imaged model.

In FIG. 4A, the model is disposed on a semi-transparent (transparent) table. Additionally, for example, a support mechanism called "Action Base" (registered trademark) may be used. In Action Base, a support pillar configured to be bent into an "L" shape is installed on a pedestal and a model can be mounted at the distal end of the support pillar. The above-described markers 410 may be disposed in the pedestal or at the distal end of the support pillar. An instruction method for the model can be changed in accordance with a pose. For example, in the case of an upright pose, the model can be disposed on the transparent table so that imaging can be performed. On the other hand, when the underside of feet is required to be imaged like a flying pose, Action Base may be used. Action Base may also be used to image an upright pose.

A display device 407 is a device corresponding to the display device 140 and may have a touch panel function. The user can perform a predetermined selection operation using the touch panel function. Instead of the touch panel, a manipulation can also be received by a controller or a mouse (not illustrated) that can function as the manipulation unit 140A. A VR headset 408 includes an HMD 408A and a controller 408B respectively corresponding to the HMD 150A and the controller 150B. The user can wear the HMD 408A on his or her head and hold and manipulate the controller 408B with right and left hands to perform a manipulation while viewing VR videos.

Figure 4B:
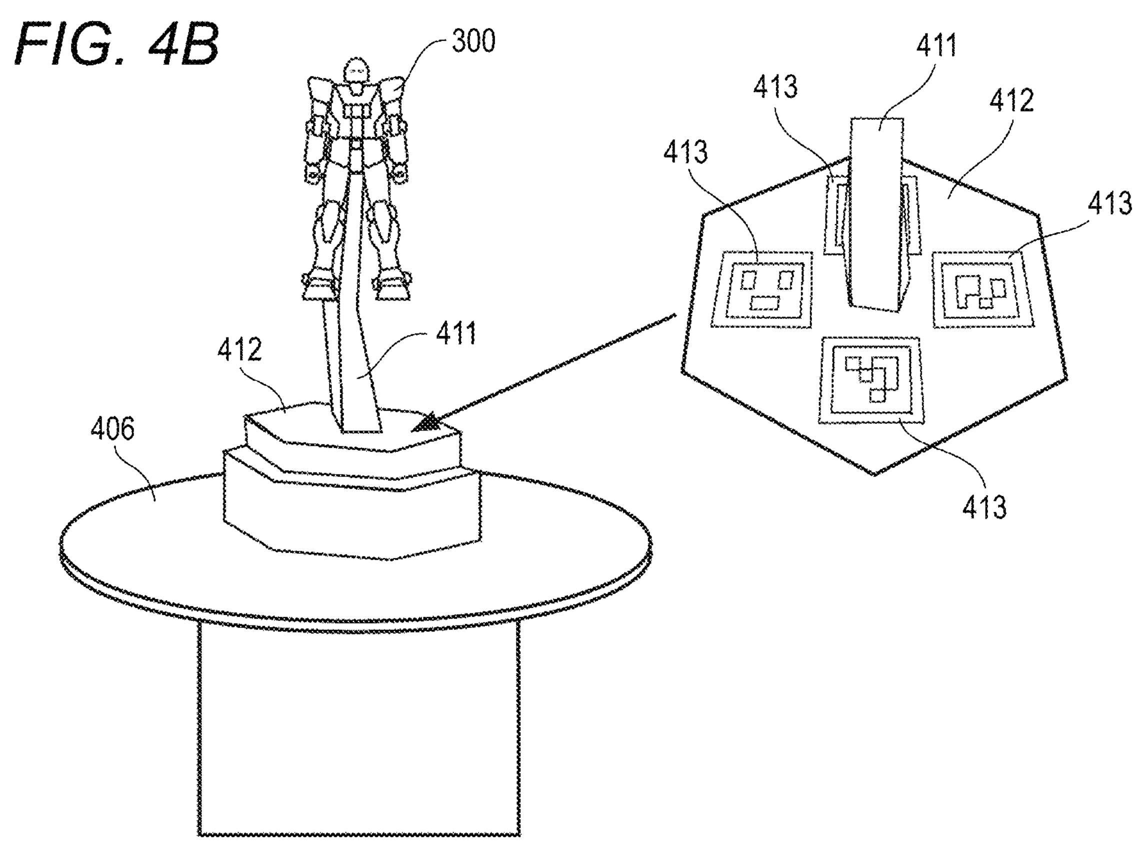
FIG. 4B is a diagram illustrating an example of installation of a model according to the embodiment.

Here, FIG. 4B illustrates an installation example when the model 300 is disposed using Action Base. In the embodiment, as illustrated in FIG. 4B, four augmented reality (AR) markers 413 are disposed on a pedestal 412 of Action Base 411 and a center and an direction of Action Base are specified by the AR markers 413.

The AR markers 413 are used to adjust a direction or a position of the imaged model. From the AR markers 413, 3-dimensional coordinates can be specified and inclinations of the X, Y, and Z axes can be specified. For example, when the 3-dimensional coordinates specified from one AR marker 413 serve as a reference, a direction or an inclination of the present data can be correctly corrected by matching the 3-dimensional coordinates specified from the remaining AR markers 413 with the reference.

When the model 300 is disposed using Action Base 411, a connection relationship between Action Base 411 and the model 300 is uniquely fixed actually. Therefore, the front face of Action Base 411 matches the front face of the model 300. Accordingly, when the front face is determined with the center and the direction of Action Base 411, the front face of the model 300 is also determined naturally. In the embodiment, the AR markers 413 may be 3-dimensional markers (markers generated by stereoscopic modeling) or may be 2-dimensional markers (for example, markers generated by seal printing). In the example illustrated in FIG. 4B, 2-dimensionally generated markers are used.

Figure 5A:
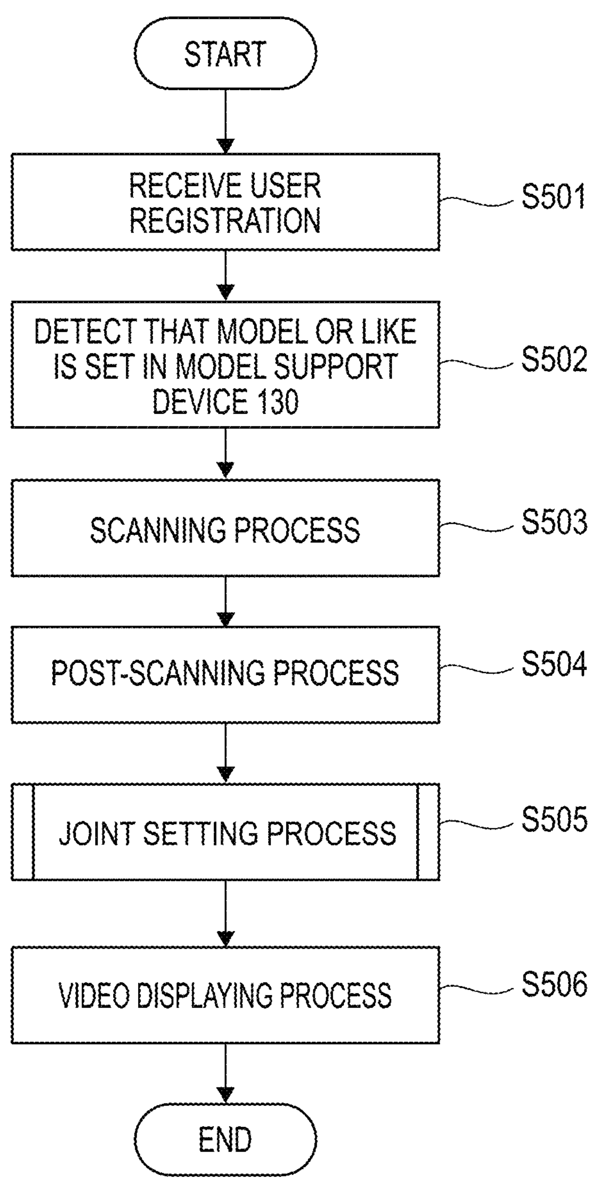
FIG. 5A is a flowchart illustrating an example of a process in the image processing system according to the embodiment.

Next, an example of a process performed by the image processing system 10 according to the embodiment will be described with reference to FIG. 5A. At least some of processes corresponding to the flowchart are implemented by causing the CPU 101 of the information processing device to execute the program stored in the ROM 103 or the storage device 104.

In S501, the CPU 101 first receives user registration. An input of a name or a contact address of the user is received. A user identifier for uniquely identifying an individual user is given to each user. The CPU 101 stores input user information in the storage device 104 in association with a time at which the input is received or the user identifier. At this time, a type of own model on which a scanning process is performed (for example, "a real type of humanoid model", "a deformation type of humanoid model", or "a model with no arms or legs", or the like) may be designated.

When the user registration is completed, the user sets the own model in the model support device 130. Based on the scan image by the scanner 110, the CPU 101 can determine whether the model 300 is set in the model support device 130. Alternatively, a switch that is turned on when the model 300 is set in the model support device 130 may be disposed so that the CPU 101 detects a signal from the switch to perform determination. Alternatively, a button that receives a manipulation when the setting of the model 300 is completed is displayed on the display device 140 and the CPU 101 can detect whether a manipulation is received for the button manipulation. In S502, the CPU 101 detects that the model 300 is set in the model support device 130 in accordance with any of the above-described methods. In response to the detection, the process proceeds to S503.

In S503, the scanner 110, the support arm 120, the model support device 130, and the depth sensor 160 perform a scanning process (imaging process) in cooperation to generate a scan image. Specifically, the CPU 101 controls the support arm 120 such that the scanner 110 is moved to one of registered imaging positions and the scanner 110 can perform scanning while the model support device 130 is rotated at the imaging position. After the model support device 130 is stopped at a predetermined rotational angle, the scanner 110 can perform an imaging operation at any imaging position and imaging angle. The captured scan image is transmitted to the information processing device 100, and the CPU 101 stores the scan image in a table of the storage device 104 in association with the user identifier or the like.

In S503, the depth information is acquired from the depth sensor 160 and operations of the scanner 110 and the support arm 120 are controlled. Specifically, the CPU 101 analyzes volume information of a scan target space acquired by the depth sensor 160, detects a position and a range, and sets a predetermined range that is a scan target (referred to as a "bounding box") in a depth space acquired by the depth sensor 160.

At this time, when an output from the depth sensor 160 is all utilized, an amount of information is considerable and information regarding a space unnecessary for an actual process (for example, a surrounding wall or the turntable 406) is even included. Therefore, a processing target may be limited in advance to depth information within a specific range (specified with a width, a height, and a depth). The bounding box is specified with a width, a height, and a depth of a space surrounding an object included in the range specified in advance. Accordingly, it can be specified how much the scan target has a volume or a size. Since the scan target is present in the bounding box, a movable range (a vertical direction and a horizontal direction) of the support arm 120 may be set based on the size of the bounding box.

The bounding box can be common regardless of a type of model 300. Accordingly, a process of setting the bounding box based on the depth information from the depth sensor 160 may be performed in advance. In this case, it is not necessary to acquire the depth information again in the process of S503.

Figure 4C:
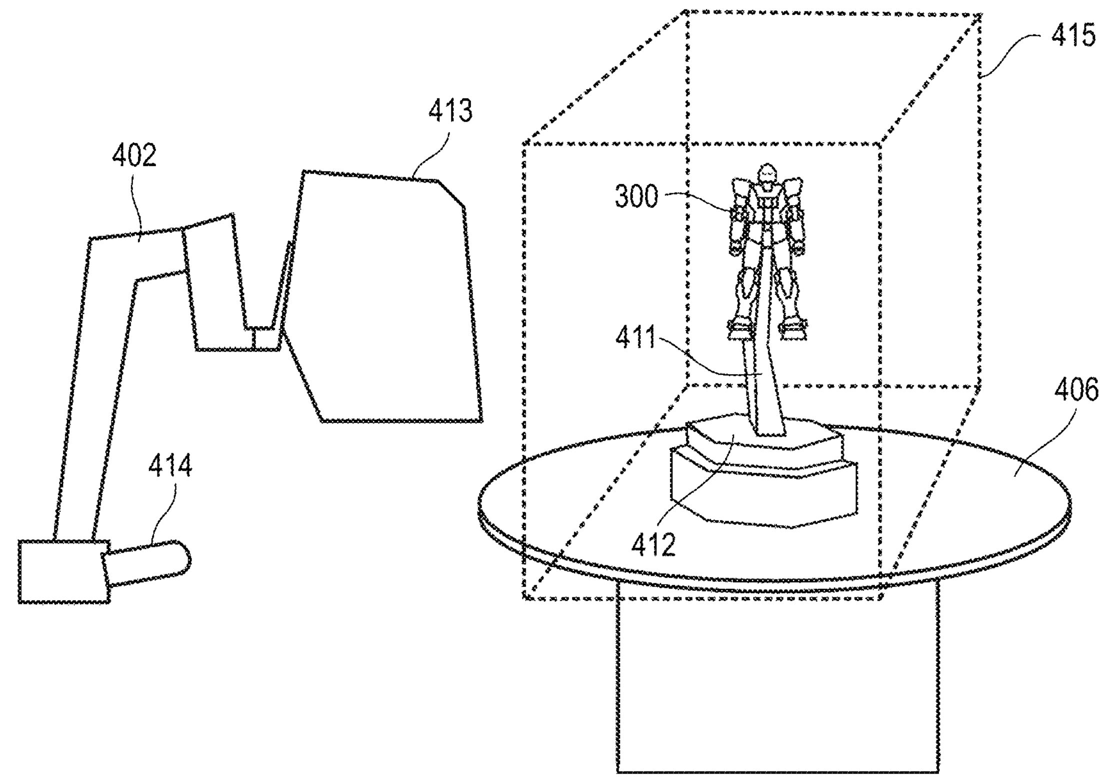
FIG. 4C is a diagram illustrating a movable range of a scanner according to the embodiment.

FIG. 4C is a diagram illustrating a concept of the bounding box. In FIG. 4C, the model 300 is supported by Action Base 411 and is disposed at a substantial center of the turntable 406. In FIG. 4C, a scanner device 413 is supported by the support arm 402. Here, Space Spider manufactured by Artec Co., Ltd. is assumed to be used. Since a driving system that drives the support arm 402, a driving system that drives the turntable 406, and the like are similar to the systems described in FIG. 4A, description thereof will be omitted.

In the scan target space above the turntable 406 illustrated in FIG. 4C, a bounding box 415 is set to contain the model 300, Action Base 411, and the pedestal 412. The reason why the bounding box contains Action Base 411 and the pedestal 412 (hereinafter collectively referred to as an "installation table") for installing the model is to acquire information for controlling a position and a pose of the 3-dimensional model data. At this time, the depth sensor 414 is installed near the pedestal below the support arm 402. By setting the bounding box 415 in this way, it is possible to limit the scan range and attain efficiency together with acceleration of a process of reducing an amount of data of a processing target.

Subsequently, in S504, the CPU 101 performs a post-scanning process on the scan image acquired through the scanning process, generates each piece of 3-dimensional model data of the model 300, and generates video display application data (display data). In the post-scanning process, a region for defining a range of unnecessary data is generated in advance and a face included in a region unnecessary to read data is deleted. Accordingly, it is possible to remove most faces other than the model 300.

In the post-scanning process, a front face of the 3-dimensional model data is specified based on the AR markers 413. By specifying the front face of the 3-dimensional model data, it is possible to improve setting accuracy when the indicator is superimposed and the joint positions are set in a joint setting process in a rear stage.

Specifically, a position and a rotational direction of each AR marker 413 in the 3-dimensional space are acquired from an analysis result of each AR marker 413 of the scan image. Subsequently, coordinates and a rotational value considered to be the center of Action Base 411 are calculated from the positions of the AR markers 413. In the embodiment, since the AR markers 413 are disposed at a given distance from the center of Action Base, the positions can be calculated based on the information. At this time, since a deviation in the central position occurs from an error in the analysis of the AR markers 413, an average value of the analysis result is determined as the central position of Action Base.

When the joint setting process to be described is performed in the rear stage, a movement amount for moving the central position to the origin of the 3-dimensional space where the joint setting process is performed is determined and the position of the 3-dimensional model data of the model 300 is corrected based on the movement amount. Accordingly, Action Base 411 can be moved to the origin of any space and can be oriented in a specific direction, and thus a front face of the 3-dimensional model data of the model 300 can be specified. Since the same process can be performed commonly on the scan data, the process can be communalized irrespective of a difference in the model 300.

Subsequently, in S505, the CPU 101 performs the joint setting process. This process is a process of embedding joint parts in the 3-dimensional model data so that an operation does not become unnatural when the 3-dimensional model data generated in the process of S504 is operated in the virtual space. Accordingly, when the 3-dimensional model data is operated in the virtual space, joint parts of a 3-dimensional model are expressed to be bent and extended in accordance with a pose, other parts are not bent unnaturally, and thus an unnatural operation can be overall removed. Details of the process of S505 will be described below with reference to FIG. 5B.

When the application data generated in the above manner is executed in a specific application in the information processing device 100, a video can be reproduced. The video includes a video of the 3-dimensional model of which joints of the 3-dimensional model data are operated based on the joint information. When the application data is executed in the specific application on the head-mounted display 150A, a VR video can be reproduced. The generated 3-dimensional model data and display data are stored in the storage device 104 in association with the user information.

Subsequently, in S506, a video displaying process is performed. When the video displaying process is performed in the information processing device 100, the CPU 101 executes a specific application corresponding to the display data and displays the video on the display device 140 via the display control unit 107. In S506, the CPU 101 may control the communication device 105 and transmit the display data to the HMD 150A and the CPU 151 of the HMD 150A may execute the received display data in a corresponding application and perform a process of displaying the VR video, so that the video displaying process is performed. When the specific application is a game application, the 3-dimensional model data executed until the joint setting process may be used as a manipulation character that is manipulated by a player in a game.

Figure 5B:
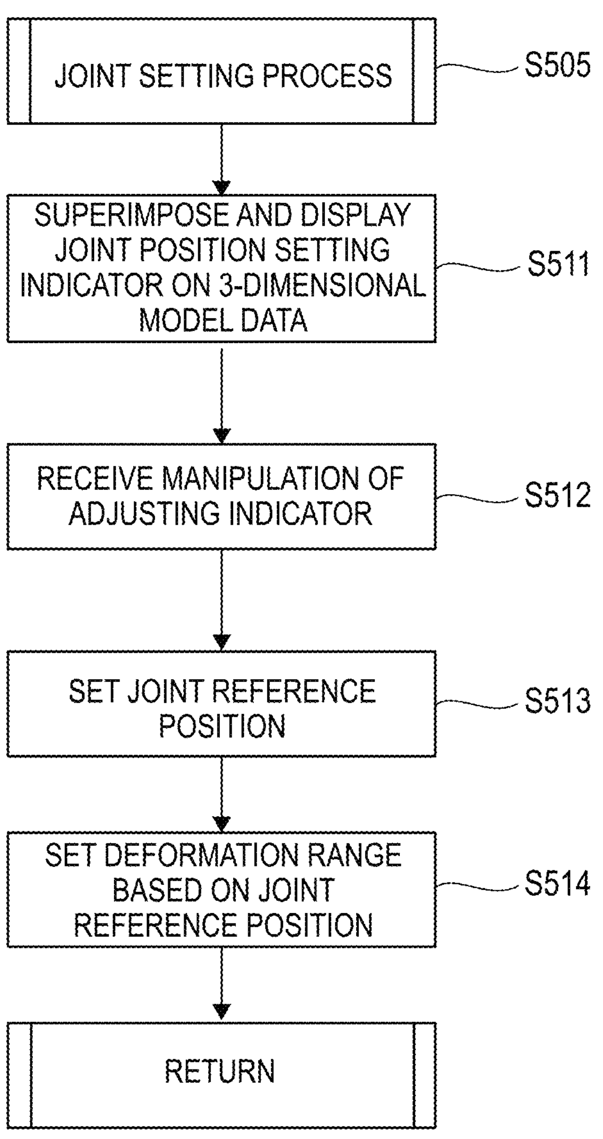
FIG. 5B is a flowchart illustrating an example of a joint setting process according to the embodiment.

Next, details of the process in S505 of FIG. 5A will be described with reference to FIG. 5B. FIG. 5B is a flowchart illustrating an example of the detailed process of the joint setting process of S505.

In S511, a joint position setting indicator is superimposed and displayed on the 3-dimensional model data generated in S504 on the display device 140. Here, examples of indicators are illustrated in FIGS. 6 to 8C.

Figure 6:
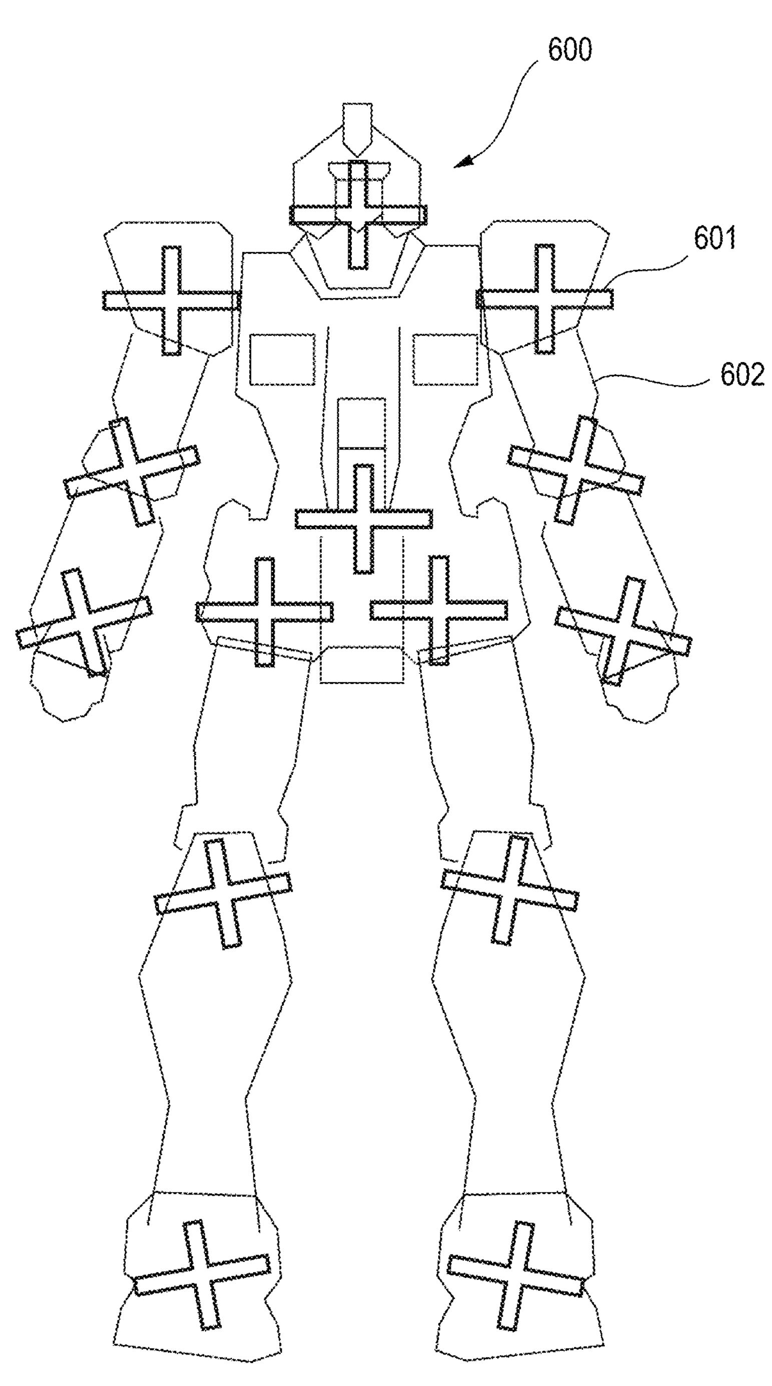
FIG. 6 is a diagram illustrating an example of a configuration of an indicator according to the embodiment.

FIG. 6 illustrates an indicator 600 for setting 2-dimensional joint positions of a standard humanoid model. Here, an index indicating each joint position is shown as a cross mark 601. The cross mark 601 is disposed at each of joint positions of a neck, shoulders, elbows, wrists, a waist, thigh roots, knees, and ankles and fourteen cross marks are disposed in FIG. 6. The indicator 600 includes a contour line 602 indicating a schematic contour of the humanoid model to notify a manipulator which joint position is indicated by each cross mark 601. Accordingly, it is possible to ascertain which part of the humanoid model each cross mark 601 indicates.

The indicator 600 illustrated in FIG. 6 can be used as a common indicator that can be applied irrespective of a type of model. Here, the indicator is not limited to a common indicator, and a plurality of indicators may be prepared in advance in accordance with a type of model that is a source of the 3-dimensional model data. At this time, the manipulator can designate the type of model. For example, the indicator 600 illustrated in FIG. 6 corresponds to a real type of humanoid model. Apart from this, an indicator corresponding to a deformation type of humanoid model may be prepared. An indicator corresponding to a model or the like in which arms and legs are omitted may be prepared additionally. At this time, any of the prepared indicators may be selected and displayed in accordance with a type of own model on which the scanning process designated in advance by the user (for example, designated in the user registration reception (S501)) is performed. Alternatively, a configuration of a part of the indicator 600 (for example, a leg part) may be able to be erased.

Figure 7A:
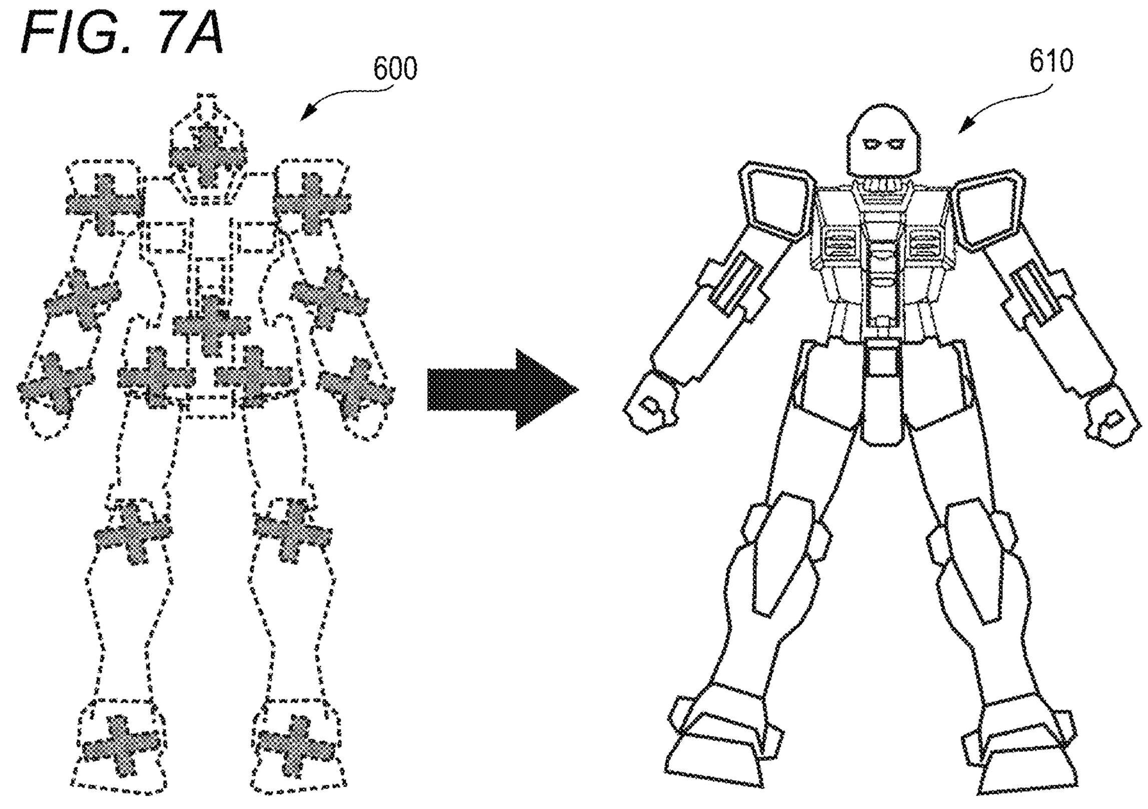
FIGS. 7A and 7B are diagrams illustrating a mode in which the indicator is superimposed on 3-dimensional model data according to the embodiment.
Figure 7B:
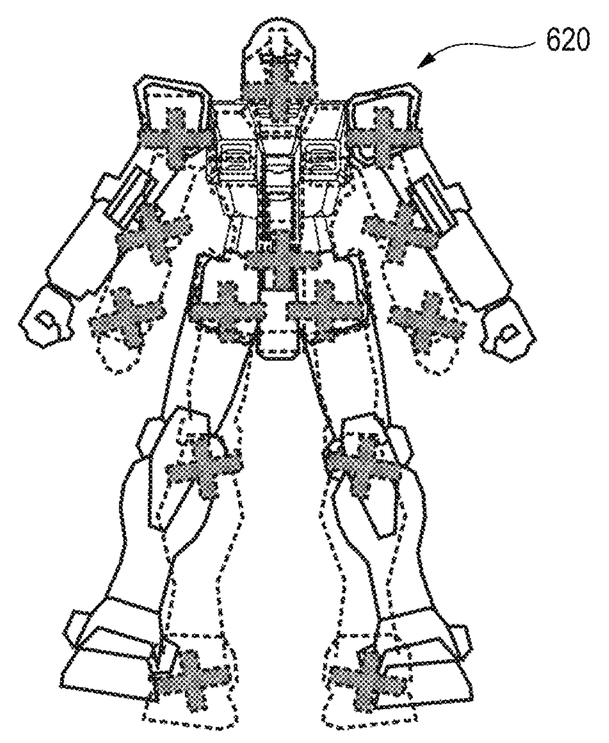

As illustrated in FIG. 7A, the indicator 600 is superimposed and displayed on 3-dimensional model data 610 so that a superimposed state 620 is obtained as illustrated in FIG. 7B. At this time, the size of the indicator 600 may be adjusted (expanded or contracted) in accordance with an overall height of the 3-dimensional model data 610. In this state, joint positions of the indicator 600 and the 3-dimensional model data 610 are not appropriately superimposed with each other and a deviation occurs. Accordingly, in S512 of the flowchart of FIG. 5B, a manipulation for adjusting the indicator is received and the cross mark 601 is moved to a corresponding joint position of the 3-dimensional model data 610.

Figure 8A:
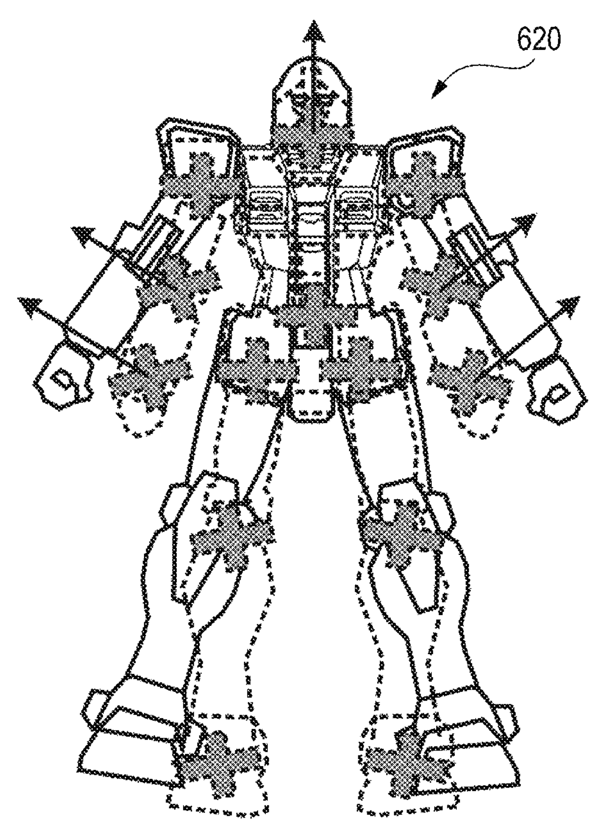
FIGS. 8A to 8C are diagrams illustrating a method of adjusting the indicator according to the embodiment.
Figure 8B:
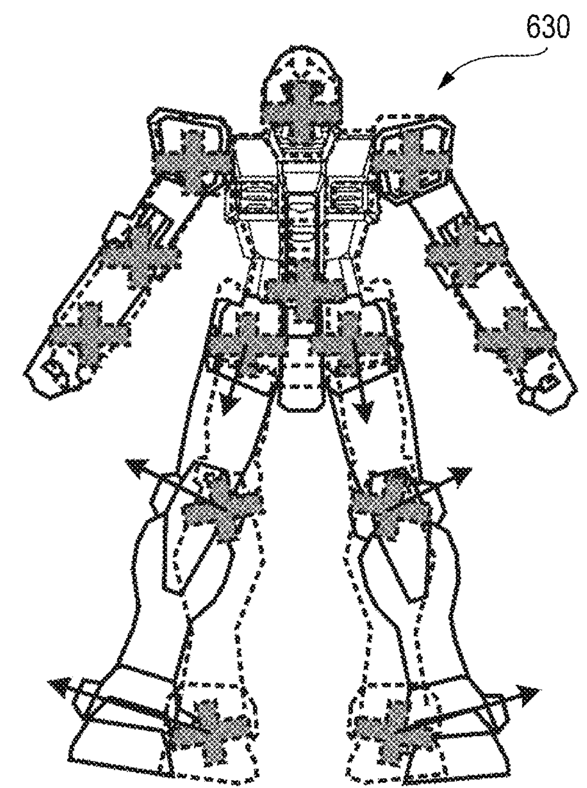
Figure 8C:
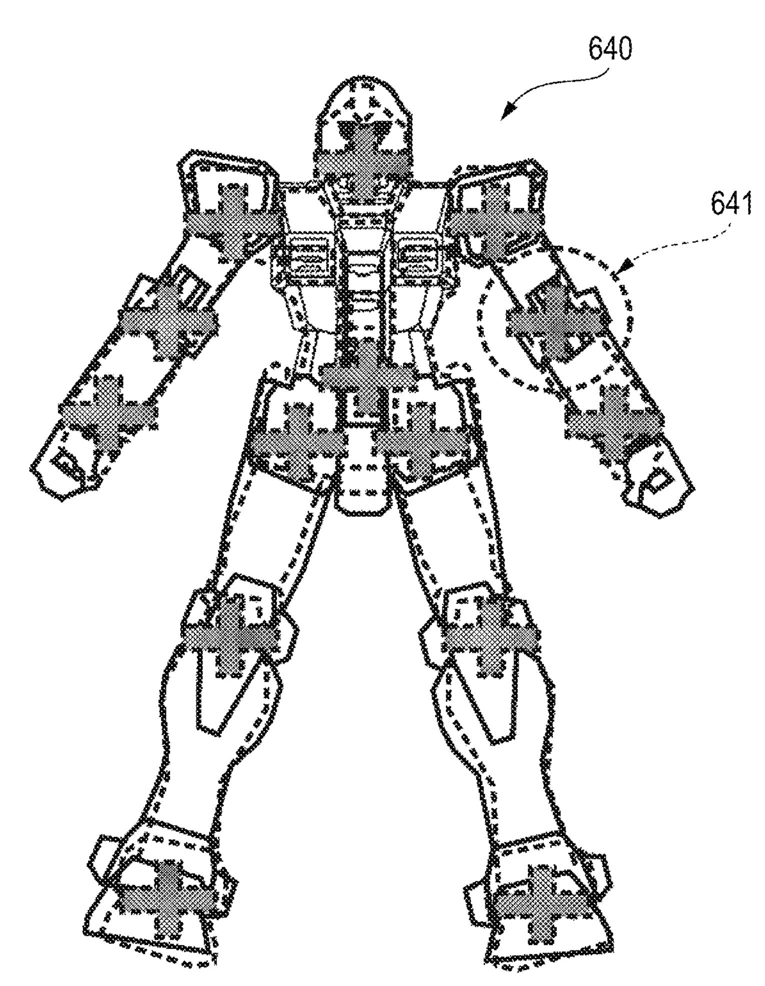

FIGS. 8A to 8C illustrates a progress for movement of the cross mark 601. FIG. 8A corresponds to the superimposed state 620 illustrated in FIG. 7B and illustrates a state in which the indicator 600 is simply superimposed on the 3-dimensional model data 610. In S512, in the superimposed state 620, a manipulation for moving the position of the cross mark 601 so that the position of the cross mark 601 is located on the joint position of the 3-dimensional model data 610 is received. The manipulator can perform a manipulation for selecting and moving the cross mark 601 (for example, a drag-and-drop manipulation), for example, using a mouse of the manipulation unit 140A. Accordingly, for example, the cross marks 601 disposed on the right and left arms are moved to the outside and are moved to elbow joint positions and wrist joint positions of the arms of the 3-dimensional model data 610, as illustrated in a superimposed state 630 of FIG. 8B. At this time, since the contour line 602 is also changed in accordance with the position of the moved cross mark 601, whether the contour line 602 is located at an appropriate position with respect to the outer shape of the 3-dimensional model data 610 (whether the contour line 602 follows the outer shape) can serve as a reference of the movement manipulation of the cross mark 601. A manipulation for deviating the position of a neck joint to the upper side is also received. Accordingly, in the superimposed state 630 of FIG. 8B, the cross mark 601 is moved to the neck joint position of the 3-dimensional model data 610.

Subsequently, a manipulation for moving each cross mark 601 disposed in the right and left legs to the outside from the superimposed state 630 of FIG. 8B is received and a manipulation of lowering joint positions of the thigh roots is received. Accordingly, the state transitions to a superimposed state 640 of FIG. 8C. In the superimposed state 640, it can be confirmed that the cross mark 601 is disposed at each joint position. In the embodiment, the position of the contour line 602 of the indicator 600 is changed by moving the cross mark 601. Conversely, the cross mark 601 may be moved to an appropriate position in accordance with modification of the contour line 602 of the indicator 600 to follow the outer shape of the 3-dimensional model data 610.

In this way, the designation of the 2-dimensional joint positions in the 3-dimensional model data 610 can be received. Subsequently, in S513, the CPU 101 sets a 3-dimensional joint position (referred to as a "joint reference position") in the 3-dimensional model data 610 based on the depth information of the 3-dimensional model data 610 and the position of the cross mark 601 received in S512. The setting of the joint reference position will be described with reference to FIGS. 9A and 9B.

Figure 9A:
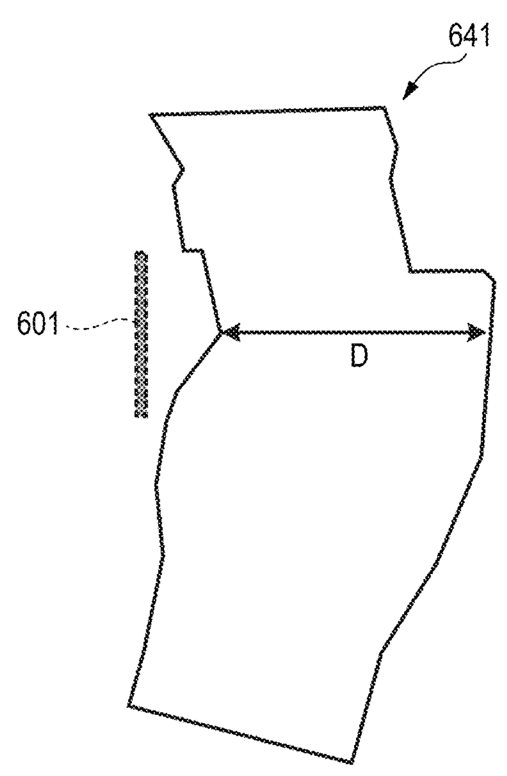
FIGS. 9A and 9B are diagrams illustrating a joint setting process according to an embodiment.
Figure 9B:
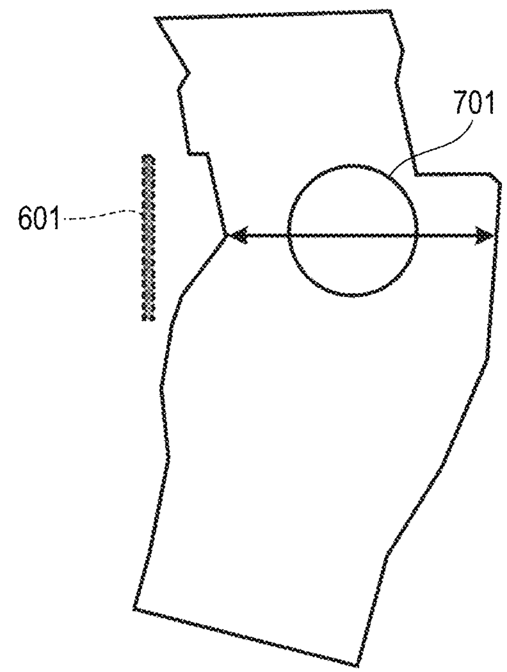

FIGS. 9A and 9B are diagrams illustrating processes in S513 and S514. FIG. 9A is a diagram illustrating an example of a cross-sectional surface of the 3-dimensional model data 610 corresponding to an elbow joint surrounded by a dotted line 641 in the depth direction in the superimposed state 640 illustrated in FIG. 8C. The cross mark 601 is superimposed on the surface of an elbow joint 641. The cross mark 601 is disposed on the surface of the elbow joint of the 3-dimensional model data 610. Actually, a reference position serving as a joint during an operation is an internal position of the elbow joint of the 3-dimensional model data and is required to be embedded inside the elbow joint from the surface of the elbow joint. An embedding amount at that time can be determined based on the depth information of the elbow joint of the 3-dimensional model data 610.

When D is a size of the elbow joint 641 in the depth direction at a position at which the cross mark 601 is a reference, for example, the joint reference position can be disposed at a position of D/2. The joint reference position is set not as a "dot" but a region that has a predetermined 3-dimensional size (or a range such as a spherical shape or a rectangular parallelepiped shape). Accordingly, the position of D/2 can be set to a center of gravity direction or a central position of the region. The position can be minutely adjusted in the 3-dimensional model data 610. FIG. 9B illustrates a mode in which a 3-dimensional region 701 is set inside the elbow joint 641. By allowing a given range and setting the joint reference position in this way, it is possible to absorb a minute deviation in the set position. Based on the joint reference position, a bone structure (or a skeleton structure or a frame structure) during movement of the 3-dimensional model data can be disposed in the 3-dimensional model data.

Referring back to FIG. 5B, subsequently, in S514, the CPU 101 sets an associated operation range based on the joint reference position set in S513. The associated operation range is a range in which there is an influence on a motion when the joint is operated based on the joint reference position or a range integrally operated in association with an operation of the joint.

In the setting of the associated operation range, parts located between the joint reference positions are classified (or divided into groups or divided into areas) so that the parts are included in the head, arm, and leg parts with reference to the set joint reference position (and the bone structure) and a polygon mesh structure of the 3-dimensional model data. Through this process, actually unconnected parts (the arm parts, the chest part, the waist part, and the like) which are adjacent parts can be processed as separate parts. To reduce a processing load, only parts that have visually large influences may be processed.

A joint is a structure that generally enables one part and the other part to be bent or extended (flexed or stretched). For example, an elbow joint is a joint connecting an upper arm to a forearm. The elbow joint can function to bend or extend the forearm with respect to the upper arm. At this time, it is necessary to specify a part belong to the upper arm or forearm part. S514 is a process of specifying an associated operation range of the joint.

In the embodiment, specifically, polygon vertexes within a predetermined range from a certain joint reference position are classified so as to be included in a part corresponding to the joint reference position. For example, the polygon vertexes within the predetermined range in a head part direction from the joint reference position located in the neck are classified so as to be included in a part referred to as "head part". Accordingly, the polygon vertexes are set as "an associated operation range of a bone structure of the head part". Therefore, when the bone structure of the head part is moved centering on the joint reference position of the neck, an "associated operation range of the bone structure of the head part" (polygon vertexes classified so as to be included in a part referred to as a "head part") can be set to be moved together with the bone structure of the head part.

Further, for example, polygon vertexes within a predetermined range in a forearm part direction from a joint reference position located in an elbow are classified so as to be included in a part referred to as a "forearm part". Accordingly, the polygon vertexes are set as "an associated operation range of a bone structure of the forearm part". Therefore, when the bone structure of the forearm part is moved centering on the joint reference position of the elbow, an "associated operation range of the bone structure of the forearm part" (polygon vertexes classified so as to be included in a part referred to as a "forearm part") can be set to be moved together with the bone structure of the forearm part.

Further, for example, polygon vertexes within a predetermined range in a lower leg part direction from a joint reference position located in a knee are classified so as to be included in a part referred to as a "lower leg part". Accordingly, the polygon vertexes are set as "an associated operation range of a bone structure of the lower leg part". Therefore, when the bone structure of the lower leg part is moved centering on the joint reference position of the knee, an "associated operation range of the bone structure of the lower leg part" (polygon vertexes classified so as to be included in a part referred to as a "lower leg part") can be set to be moved together with the bone structure of the lower leg part.

When the range is too fine, a processing load becomes high and a processing time becomes long. Conversely, when the range is too wide, there may be an influence of a joint even on an originally unrelated part and there may be a discomfort when a video is viewed. Accordingly, it is necessary to appropriately set the associated operation range. A plurality of settings of the associated operation range may be prepared in accordance with a type of scanned model (for example, "a real type of humanoid model", "a deformation type of humanoid model", or "a model with no arms or legs", or the like) and may be selected or automatically selected in accordance with a type of model.

Figure 10:
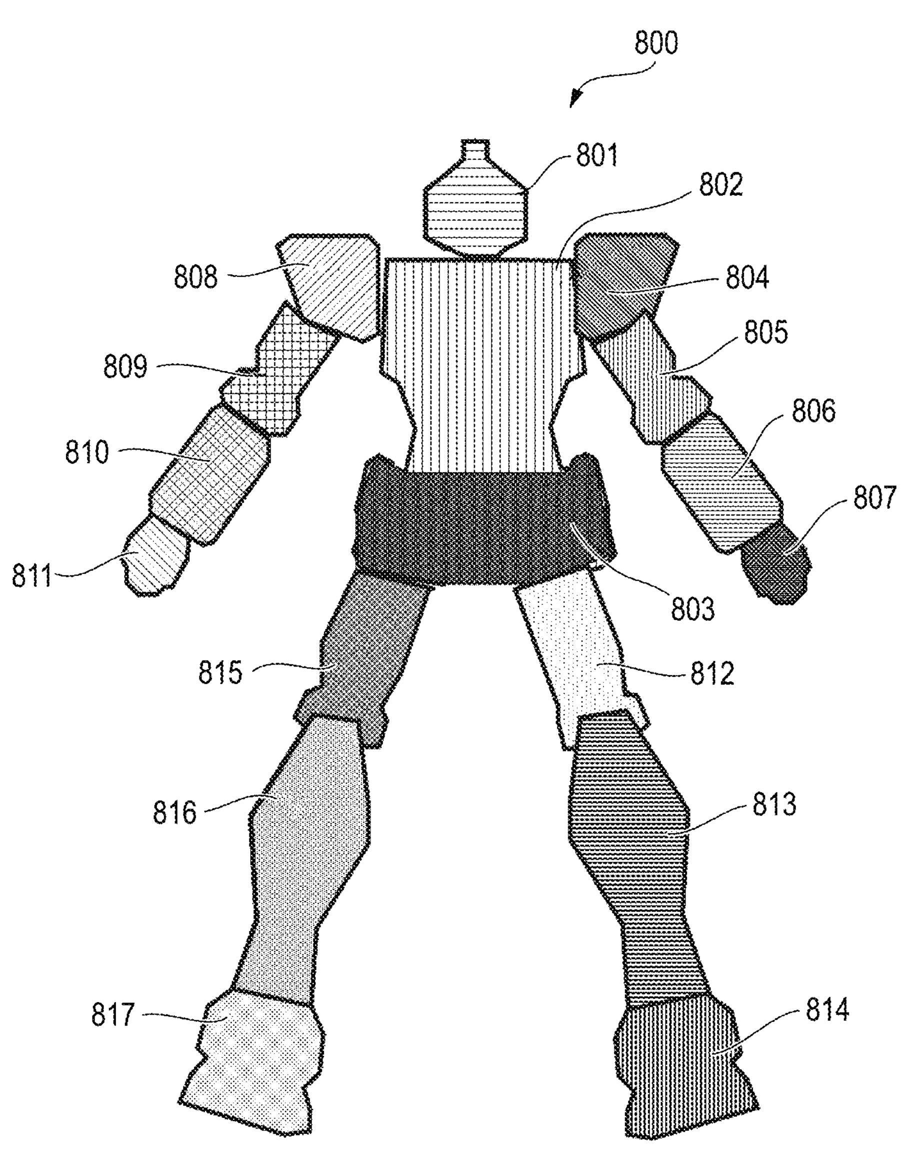
FIG. 10 is a diagram illustrating an example of setting of an associated operation range for the 3-dimensional model data according to an embodiment.

FIG. 10 is a diagram illustrating an example of setting of an associated operation range for 3-dimensional model data 800 of the model 300. Here, a head part 801, a chest part 802, a waist part 803, a left shoulder part 804, a left upper arm part 805, a left forearm part 806, a left hand part 807, a right shoulder part 808, a right upper arm part 809, a right forearm part 810, a right hand part 811, a left thigh part 812, a left lower leg part 813, a left foot part 814, a right thigh part 815, a right lower leg part 816, and a right foot part 817 are each classified into the same group as an associated operation range. The range included in the group of the 3-dimensional model data 710 operates integrally with the corresponding joint motion. For example, in the case of a hip joint, the left and right thigh parts operate together. In the case of a knee joint, the left and right lower leg parts operate together. The associated operation range illustrated in FIG. 10 includes a range specified as being sandwiched between two joint reference positions, such as the left and right upper arm parts, the left and right forearm parts, the left and right thigh parts, or the left and right lower leg parts.

The CPU 101 performs the above-described processes of S513 and S514 on all the joint positions on which the cross marks 601 are superimposed in the superimposed state 640 of FGI. 8C and stores obtained positional information of a joint reference position 701 and information regarding an associated operation range 702 as joint information in the storage device 104 in association with the user information and the 3-dimensional model data. Thereafter, the process proceeds to S506.

In this way, in the embodiment, when the 3-dimensional model data is generated from an image obtained by imaging a model by the scanner, joint information for specifying a position and a range of joints of the 3-dimensional model data can be associated. Accordingly, when the 3-dimensional model data is disposed in a virtual space and a video is displayed, an operation for the 3-dimensional model data can be controlled in accordance with the joint information set for the 3-dimensional model data. At this time, the joints of the 3-dimensional model data are not bent unnaturally and a viewing person does not feel discomfort.

In the embodiment, since a range imaged by the scanner can be narrowed using the depth sensor 160, an amount of data to be processed can be reduced. Accordingly, it is possible to make the process efficient and shorten a processing time. Further, when a model is imaged by the scanner, the markers capable of detecting a position or an inclination of an installation table on which the model is installed can be disposed to cancel a difference in a condition during the imaging through correction in the rear stage. Accordingly, even when a plurality of different models are scanned, a common installation table can be used and accuracy of a condition for the installation can be alleviated to some extent.

The 3-dimensional model data acquired in the above-described embodiment can be used, for example, to execute a battle game executed in a virtual space or generate a promotion moving image. Here, a purpose of the 3-dimensional model data is not limited thereto and the model can also appear in an event, a concert, a sports game, an online conference, or the like carried out in a virtual space. Further, the technique of the embodiment can also be applied to a video technique capable of merging the real word and a virtual world, such as Cross Reality (XR) and allowing a person to perceive an object that is not present in the real space.

In this way, in the embodiment, the 3-dimensional model data can be generated from images obtained by imaging the outer appearance of a model and a video in which the 3-dimensional model is disposed in a virtual space can be viewed. Like an assembly plastic model, for example, a user can paint the model and finish the model as a unique item. Since the individual feature can be reflected in representation of a character in a moving image or a virtual space, preference can be significantly improved.

Conclusion of Embodiment

The above embodiment discloses at least the following information processing device and computer program.

(1) An information processing device including:

a scan controller configured to cause a scanner to scan an outer appearance of an object disposed on a table while controlling a position and an angle of the scanner and generate a scan image;

a data generator configured to generate 3-dimensional model data from the scan image;

a video generator configured to generate a video in which a 3-dimensional model based on the 3-dimensional model data is disposed in a virtual space; and a receiver configured to receive a designation input of joint positions for the 3-dimensional model data, in which the data generator is configured to generate the 3-dimensional model data in association with joint information on joint positions designated by the designation input, and in which the video generator is configured to generate the video of the 3-dimensional model in which a joint of the 3-dimensional model data is operated based on the joint information.

(2) The information processing device according to (1), in which the receiver includes:

a manipulation receiver configured to allow a user of the information processing device to input a manipulation; and a display, and in which the receiver is configured to receive the designation input of the joint positions by the display superimposing and displaying an indicator including a plurality of indexes indicating joint positions on the 3-dimensional model data, and the manipulation receiver receiving a manipulation for matching positions of the plurality of indexes with positions of predetermined joints of the 3-dimensional model data.

(3) The information processing device according to (2), in which the indicator is selected from different types of indicators in accordance with a type of the object.

(4) The information processing device according to (2), in which the indicator is commonly used irrespective of a difference in a type of the object.

(5) The information processing device according to (2), in which the data generator is configured to:

determine embedding amounts of joint reference positions based on information regarding depths of the 3-dimensional model data at the joint positions designated by the designation input, each of the joint reference positions a being position at which a corresponding joint in the 3-dimensional model data is to be operated;

determine the joint reference positions based on the joint positions and the embedding amounts, and associate the joint reference positions as the joint information with the 3-dimensional model data.

(6) The information processing device according to (5), in which the data generator is configured to set each of the joint reference positions in an intermediate part of a depth range at the corresponding joint in the 3-dimensional model data.

(7) The information processing device according to (5), in which the data generator is configured to determine associated operation ranges based on the joint reference positions, each of the associated operation ranges being a range to be operated in the 3-dimensional model data in conjunction with an operation of a joint in the 3-dimensional model data when the joint is operated in the 3-dimensional model data, and in which the joint information further includes the associated operation ranges.

(8) The information processing device according to (7), in which the associated operation ranges includes a range specified as a range between the joint reference positions.

(9) The information processing device according to any one of (2) to (7), in which a plurality of markers are provided on a surface of a pedestal of the table on which the object is disposed, and the plurality of markers being configured such that positions and rotational directions thereof in a 3-dimensional space are acquirable, and in which the data generator is configured to extract information regarding the plurality of markers from the scan image, specify a position of the table on which the object is disposed, and correct a position and a direction of the 3-dimensional model data based on the position of the table.

(10) The information processing device according to (9), in which, in a correction of the position and the direction of the 3-dimensional model data, the direction of the 3-dimensional model data is corrected to be oriented in a direction matching a front face of the indicator when the indicator is superimposed and displayed on the 3-dimensional model data.

(11) The information processing device according to (9) or (10), in which the plurality of markers are an Augment Reality markers.

(12) The information processing device according to any one of (1) to (11), further including:

a depth sensor configured to acquire depth information on a range in which the scanner performs scanning, wherein the scan controller is configured to control a position and an angle of the scanner based on the depth information acquired by the depth sensor.

(13) The information processing device according to (11), in which the scan controller is configured to set a range including the object disposed on the table and the table and control the position and the angle of the scanner so that the set range is scanned.

(14) The information processing device according to (1) to (11), further including a depth sensor configured to acquire depth information on a range in which the scanner performs scanning, in which the scan controller is configured to set a range including the object disposed on the table and the table and cause the scanner to only scan the set range.

(15) A non-transitory computer-readable storage medium that stores computer-executable program including instructions which, when executed by a computer, cause a computer to function as:

a scan controller configured to cause a scanner to scan an outer appearance of an object disposed on a table while controlling a position and an angle of the scanner and to generate a scan image;

a data generator configured to generate 3-dimensional model data from the scan image;

a video generator configured to generate a video in which a 3-dimensional model based on the 3-dimensional model data is disposed in a virtual space; and a receiver configured to receive a designation input of joint positions for the 3-dimensional model data, in which the data generator is configured to generate the 3-dimensional model data in association with joint information on the joint positions represented by the designation input, and in which the video generator is configured to generate the video of the 3-dimensional model in which a joint of the 3-dimensional model data is operated based on the joint information.

The present invention is not limited to the above embodiments and can be modified and changed in various forms within the scope of the gist of the present invention.

What is claimed is:

1. An information processing device comprising:

a scan controller configured to cause a scanner to scan an outer appearance of an object disposed on a table and generate a scan image;

a data generator configured to generate 3-dimensional model data from the scan image;

a video generator configured to generate a video in which a 3-dimensional model based on the 3-dimensional model data is disposed in a virtual space; and a receiver configured to receive a designation input of joint positions for the 3-dimensional model data, wherein the data generator is configured to generate the 3-dimensional model data in association with joint information on the joint positions designated by the designation input, wherein the video generator is configured to generate the video of the 3-dimensional model in which a joint of the 3-dimensional model data is operated based on the joint information, wherein the receiver includes:

a manipulation receiver configured to allow a user of the information processing device to input a manipulation; and a display, wherein the receiver is configured to receive the designation input of the joint positions by the display superimposing and displaying an indicator including a plurality of indexes indicating joint positions on the 3-dimensional model data, and the manipulation receiver receiving a manipulation for matching positions of the plurality of indexes with positions of predetermined joints of the 3-dimensional model data, and wherein the data generator is configured to:

determine embedding amounts of joint reference positions based on information regarding depths of the 3-dimensional model data at the joint positions designated by the designation input, each of the joint reference positions a being position at which a corresponding joint in the 3-dimensional model data is to be operated;

determine the joint reference positions based on the joint positions and the embedding amounts; and associate the joint reference positions as the joint information with the 3-dimensional model data.

2. The information processing device according to claim 1, wherein the indicator is selected from different types of indicators in accordance with a type of the object.

3. The information processing device according to claim 1, wherein the indicator is commonly used irrespective of a difference in a type of the object.

4. The information processing device according to claim 1, wherein the data generator is configured to set each of the joint reference positions in an intermediate part of a depth range at the corresponding joint in the 3-dimensional model data.

5. The information processing device according to claim 1, wherein the data generator is configured to determine associated operation ranges based on the joint reference positions, each of the associated operation ranges being a range to be operated in the 3-dimensional model data in conjunction with an operation of a joint in the 3-dimensional model data when the joint is operated in the 3-dimensional model data, and wherein the joint information further includes the associated operation ranges.

6. The information processing device according to claim 5, wherein the associated operation ranges include a range specified as a range between the joint reference positions.

7. The information processing device according to claim 1, wherein a plurality of markers are provided on a surface of a pedestal of the table on which the object is disposed, and the plurality of markers being configured such that positions and rotational directions thereof in a 3-dimensional space are acquirable, and wherein the data generator is configured to extract information regarding the plurality of markers from the scan image, specify a position of the table on which the object is disposed, and correct a position and a direction of the 3-dimensional model data based on the position of the table.

8. The information processing device according to claim 7, wherein, in a correction of the position and the direction of the 3-dimensional model data, the direction of the 3-dimensional model data is corrected to be oriented in a direction matching a front face of the indicator when the indicator is superimposed and displayed on the 3-dimensional model data.

9. The information processing device according to claim 7, wherein the plurality of markers are Augment Reality markers.

10. The information processing device according to claim 1, further comprising a depth sensor configured to acquire depth information on a range in which the scanner performs scanning, wherein the scan controller is configured to control a position and an angle of the scanner based on the depth information acquired by the depth sensor.

11. The information processing device according to claim 10, wherein the scan controller is configured to set a range including the object disposed on the table and the table and control a position and an angle of the scanner so that the set range is scanned.

12. The information processing device according to claim 1, further comprising a depth sensor configured to acquire depth information on a range in which the scanner performs scanning, wherein the scan controller is configured to set a range including the object disposed on the table and the table and cause the scanner to only scan the set range.

13. The information processing device according to claim 1, wherein receiving the designation input of the joint positions is performed on a 2-dimensional view viewing the 3-dimensional model data in a fixed direction, and the depths of the 3-dimensional model data at the joint positions are depths in the fixed direction.

14. A non-transitory computer-readable storage medium that stores computer-executable program comprising instructions which, when executed by a computer, cause a computer to function as:

a scan controller configured to cause a scanner to scan an outer appearance of an object disposed on a table and to generate a scan image;

a data generator configured to generate 3-dimensional model data from the scan image;

a video generator configured to generate a video in which a 3-dimensional model based on the 3-dimensional model data is disposed in a virtual space; and a receiver configured to receive a designation input of joint positions for the 3-dimensional model data, wherein the data generator is configured to generate the 3-dimensional model data in association with joint information on the joint positions represented by the designation input, wherein the video generator is configured to generate the video of the 3-dimensional model in which a joint of the 3-dimensional model data is operated based on the joint information, wherein the receiver includes a manipulation receiver configured to allow a user to input a manipulation, wherein the receiver is configured to receive the designation input of the joint positions by superimposing and displaying an indicator on the 3-dimensional model data on displayed on a display, the indicator including a plurality of indexes indicating joint positions, and receiving a manipulation for matching positions of the plurality of indexes with positions of predetermined joints of the 3-dimensional model data, and wherein the data generator is configured to:

determine embedding amounts of joint reference positions based on information regarding depths of the 3-dimensional model data at the joint positions designated by the designation input, each of the joint reference positions a being position at which a corresponding joint in the 3-dimensional model data is to be operated;

determine the joint reference positions based on the joint positions and the embedding amounts; and associate the joint reference positions as the joint information with the 3-dimensional model data.

15. The non-transitory computer-readable storage medium according to claim 14, wherein receiving the designation input of the joint positions is performed on a 2-dimensional view viewing the 3-dimensional model data in a fixed direction, and the depths of the 3-dimensional model data at the joint positions are depths in the fixed direction.

* * * * *